May 11, 1926.

J. B. SKEEN

BRAKING DEVICE

Filed Dec. 10, 1924

1,584,669

Jesse B. Skeen
INVENTOR

BY Victor J. Evans
ATTORNEY

WITNESS: G. T. L. Wright

Patented May 11, 1926.

1,584,669

UNITED STATES PATENT OFFICE.

JESSE B. SKEEN, OF LOS ANGELES, CALIFORNIA.

BRAKING DEVICE.

Application filed December 10, 1924. Serial No. 755,027.

This invention relates to an attachment for a motor vehicle, the general object of the invention being to provide means for preventing rearward movement of the vehicle on up-grades and other places without the use of foot or emergency brakes and without interfering with the forward movement of the vehicle.

Another object of the invention is to so arrange the parts that the device can be set to operative position to prevent the vehicle from moving rearwardly while the car is being propelled forwardly so that it is not necessary to render the device inoperative unless the vehicle is to be propelled rearwardly, thus enabling the operator to place the device in inoperative position after danger of a car or vehicle moving rearwardly has passed.

Another object of the invention is to so position the parts that they will operate to brake the vehicle without placing any strain upon the parts of the same.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
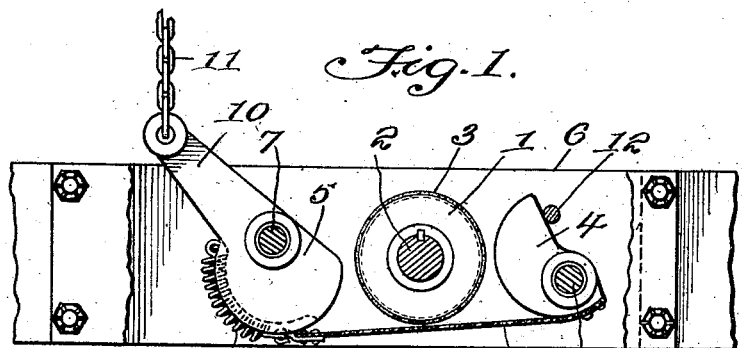
Figure 1 is a sectional view through the attachment with parts in elevation.
Figure 2:
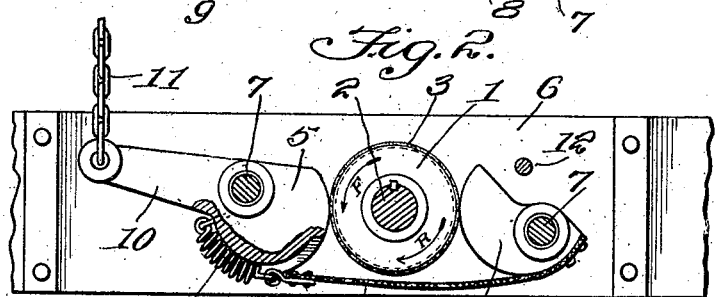
Figure 2 is a similar view but showing the parts in braking position.

As shown in these views, I attach a brake wheel 1 to the propeller shaft 2 of a vehicle, preferably adjacent the front end of said shaft, this wheel carrying a brake lining 3. A pair of brake members 4 and 5 of cam shape is carried by a frame 6 through which the shaft 2 passes and which embraces the wheel 1. Each brake member is carried by a shaft 7 mounted in the frame 6 and these members are so positioned that when in operative position they will engage the wheel 1 at diametrically opposite points, as shown in Figure 2, so as to prevent strain on the shaft. The two members are connected together by a flexible member 8 and a spring 9 so that when the member 5 is moved, as will hereinafter be described, the member 4 will also be moved, both members tending to assume their braking positions under the action of gravity with the member 5 moving upwardly and member 4 downwardly so that if the propeller shaft should start to rotate in the direction of the letter R, Figure 2, the brake wheel 1 would be gripped by the members 4 and 5 and thus be stopped. However, the propeller shaft can move in the direction of the arrow F, as the members 4 and 5 will give to permit this forward movement without interference from said members. An arm 10 is formed on the member 5 and a chain 11 is fastened to the outer end of said arm and is adapted to be detachably fastened to a part of the vehicle adjacent the driver's seat so that the driver can easily release the chain to permit the arm 10 to move downwardly under the action of gravity which will slacken the member 8 and permit the cam 4 to drop downwardly under the action of gravity and thus cause the members 4 and 5 to engage the wheel 1. The initial downward movements of the arm 10 and the cam 5 will be facilitated by the spring 9 as this spring will be slightly tensioned when the parts are in inoperative position, the cam 4 resting against a stop pin 12 when in raised position.

From the foregoing it will be seen that the members 4 and 5, when in operative position, will engage the lining of wheel 1 and as long as the propeller shaft is rotating to propel the vehicle in a forward direction the wheel will simply slip over the members without interference from such members. However, if the shaft should start to revolve in a reverse direction the members 4 and 5 would tightly grip the lining of the wheel and thus prevent further movement of the propeller shaft and in this manner prevent the vehicle from rolling rearwardly. Thus I have provided effectual means for preventing a vehicle from moving rearwardly down a grade while permitting it to be propelled forwardly so that it is not necessary to use the foot or emergency brakes on a hill or other place. This device will prevent a car from running backwards down a hill and it will permit the brakes of a car standing on a hill to be removed and then the engine started, thus avoiding danger of choking the engine as in the case where it is necessary to remove the brakes after the engine is started up to prevent the car backing down the hill. It often happens that the brakes are not removed quickly enough, and thus the engine is choked. With this invention, the brakes can be removed and the device will prevent rearward movement of the vehicle, while permitting it to be moved forwardly under the action of the engine. It will leave both feet and hands free to manipulate the clutch and throttle as it is not necessary to use either the foot brake or the emergency brake. As the device will not interfere with the forward movement of the vehicle it is not necessary to render the same inactive until the car has made the grade or the driver has an opportunity to fasten the chain 11 to its support. When this is done the arm 10 is moved upwardly, the cam part 5 downwardly and this movement will be communicated to the member 4 to raise the same against the pin 12 by the strap 8 and the spring 9.

Figure 3:
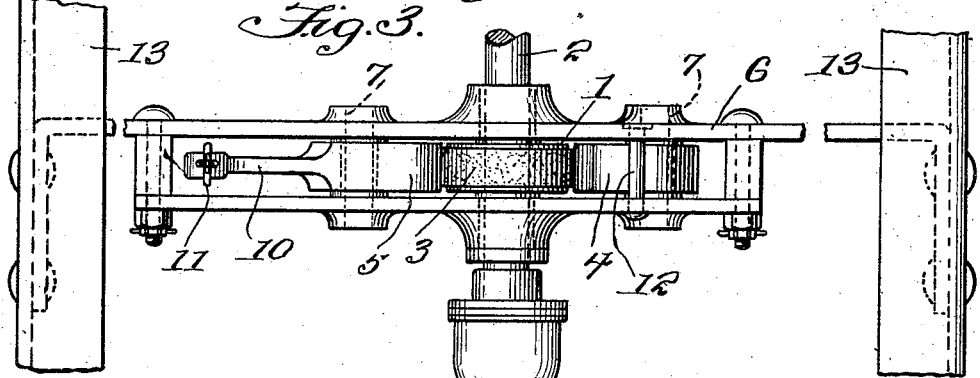
Figure 3 is a plan view with the device attached to the side bars of a vehicle.
Figure 4:
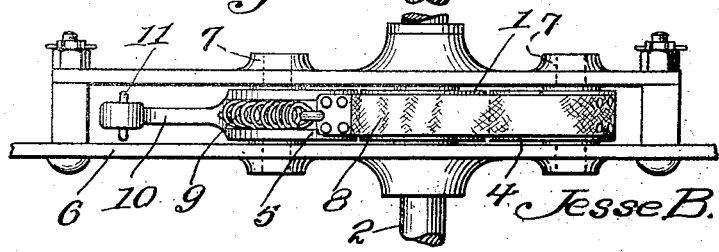
Figure 4 is a bottom plan view.

The frame 6 can be fastened to the side members 13 of the chassis of the vehicle, as shown in Figure 3.

This invention will permit starting of a vehicle on the steepest grade with the same ease and facility as starting on level ground.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a motor vehicle, a brake wheel connected with a shaft thereof, a pair of cam-shaped members for engaging the brake wheel under the action of gravity and arranged to prevent movement of the shaft to propel the vehicle rearwardly while permitting the shaft to be turned in a direction to propel the car forwardly, means for moving the members out of engagement with the brake wheel, such means consisting of a flexible member connected with a part of one member and flexible and yieldable means for connecting the members together.

2. In a motor vehicle, a brake wheel connected with the propeller shaft thereof, a frame through which the shaft passes, a pair of cam-shaped members carried by the frame, the members being arranged one at each side of the wheel and the members being designed to contact with the wheel at diametrically opposite points, an arm on one cam member for causing the member to move upwardly into engagement with the wheel under the action of gravity, while the other cam member moves downwardly under the action of gravity, an operating member connected with the arm and yieldable and flexible means for connecting the members together so that the two members can be moved out of engagement with the brake wheel simultaneously.

In testimony whereof I affix my signature.

JESSE B. SKEEN.